A. B. BEAN.
Machinery-Clutch.
No. 148,165.  Patented March 3, 1874.
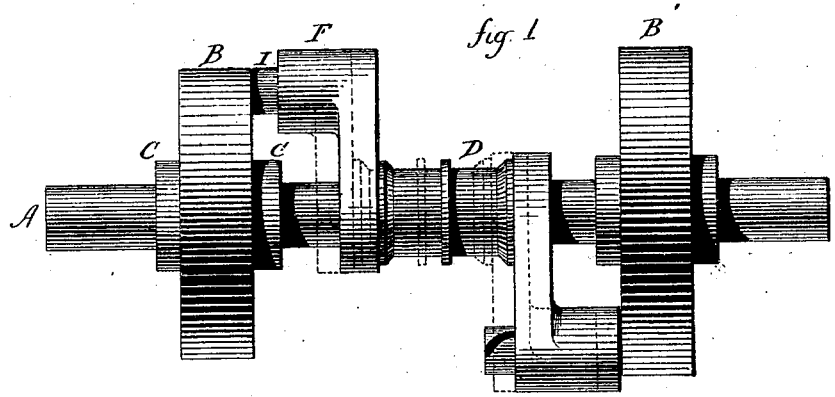
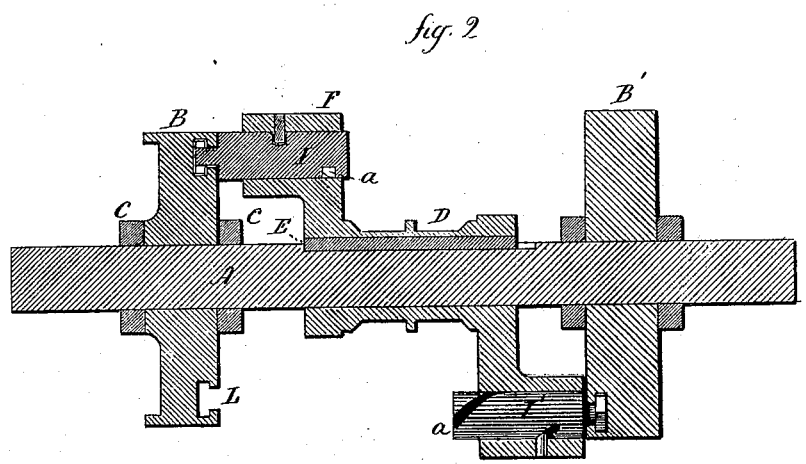

UNITED STATES PATENT OFFICE.

ALBERT B. BEAN, OF NEW HAVEN, CONNECTICUT.

IMPROVEMENT IN MACHINERY CLUTCHES.

Specification forming part of Letters Patent No. 148,165, dated March 3, 1874; application filed February 11, 1874.

*To all whom it may concern:*

Be it known that I, ALBERT B. BEAN, of New Haven, in the county of New Haven and State of Connecticut, have invented a new Improvement in Machinery-Clutch; and I do hereby declare the following, when taken in connection with the accompanying drawings and the letters of reference marked thereon, to be a full, clear, and exact description of the same, and which said drawings constitute part of this specification, and represent in—

Figure 1 a front view, and in Fig. 2 a longitudinal section.

This invention relates to an improvement in what is known as machinery-clutch—that is to say, a device by which to connect or disconnect a pulley with the shaft upon which it is placed, so that when required the revolution of the driven one may be communicated to the other.

By the term pulley in this specification, I wish to be understood as including gears, or whatever device it may be for receiving or communicating power.

This invention consists in combining a sleeve on the shaft, constructed so as to revolve with the shaft, but to have a free longitudinal movement thereon, and a pulley loose upon or independent of the said shaft, with a spirally-grooved bar arranged in connection and so as to revolve with the said sleeve, and also in connection with said pulley, and constructed so that a longitudinal movement of the said sleeve will impart a rotative movement to said bar, and cause it to clamp or free the said pulley accordingly as the sleeve is moved toward or from the said pulley, as hereinafter described.

A is the shaft; B, the pulley, loose upon the shaft, and prevented by the collar C from longitudinal movement. D is the sleeve, fitted to the shaft, and connected thereto by a spline, E, or other known device, which will cause the two to revolve together, and yet allow a free longitudinal movement of the sleeve toward or from the pulley. In connection with the sleeve D, preferably in an arm, F, projecting therefrom, I place a bar, I, parallel, or nearly so, to the shaft, the said bar fitted in the arm so as to allow the free longitudinal movement of the arm over the bar. The bar is constructed with a spiral groove, a, into which a stud, d, in the arm sets, so that a longitudinal movement of the sleeve will, through the said stud and spiral groove, impart a rotative movement to the bar. The end of the bar I, next the pulley, is connected to the pulley, so that the rotation of the bar in one direction will engage the pulley and cause it to revolve with the bar, sleeve, and shaft, but the rotation of the bar in the opposite direction will disengage the pulley and free it from the action of or upon the shaft, as the case may be. This connection I prefer to make as represented—that is, by a T-shaped groove, L, in the side of the pulley, into which a nut, d', is placed, and the end of the bar I constructed with a thread corresponding to said nut, as seen in Fig. 1, and the nut and arm set so close together that the rotation imparted to the bar from the sleeve, as by moving the sleeve to the position denoted in broken lines, Fig. 1, will bind or clamp the pulley between them with sufficient force to couple the shaft and pulley together, and the return of the sleeve causes a corresponding disconnection.

In cases where two pulleys are used, as in counter-shafts for screw-cutting lathes, the second pulley B' is constructed and arranged in like manner with a corresponding bar, I', so that throwing the sleeve in one direction will engage one pulley, and in the other direction, will engage the other, or in an intermediate position, leave both pulleys free.

This description and illustration will enable those skilled in this class of mechanical devices to apply this invention to other purposes.

I claim as my invention—

In combination with a shaft and pulley, loose thereon, and the sleeve D, in connection with said shaft, so as to revolve therewith, but free for longitudinal movement, the spirally grooved bar I, connected with said sleeve and pulley, substantially as described, so that a longitudinal movement of said sleeve will impart a rotation to said bar, to couple said pulley with the sleeve and shaft, or uncouple, as the case may be.

A. B. BEAN.

Witnesses:
  J. H. SHUMWAY,
  A. J. TIBBITS.